(12) United States Patent
Westhues et al.

(10) Patent No.: US 8,619,167 B2
(45) Date of Patent: Dec. 31, 2013

(54) SCANNED BEAM DISPLAY AND IMAGE CAPTURE

(75) Inventors: Jonathan Westhues, New York, NY (US); Amar S. Vattakandy, Longmont, CO (US); Randall Crane, Fort Collins, CO (US); John R. Lewis, Bellevue, WA (US); Steven Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 12/835,658

(22) Filed: Jul. 13, 2010

(65) Prior Publication Data

US 2011/0267501 A1 Nov. 3, 2011

Related U.S. Application Data

(60) Provisional application No. 61/328,951, filed on Apr. 28, 2010.

(51) Int. Cl.
*H04N 9/07* (2006.01)

(52) U.S. Cl.
USPC .............................. 348/260; 348/266; 348/203

(58) Field of Classification Search
USPC .......... 359/196.1, 199.1, 201.2, 202.1; 345/7, 345/30, 156, 204; 348/205, E3.053, 348/744–789; 353/30–34, 52–61
See application file for complete search history.

(56) References Cited

U.S. PATENT DOCUMENTS

| | | | |
|---|---|---|---|
| 5,059,987 A * | 10/1991 | Takeyama et al. | 347/247 |
| 6,002,505 A * | 12/1999 | Kraenert et al. | 359/196.1 |
| 6,590,606 B1 * | 7/2003 | Hiller et al. | 348/203 |
| 7,302,174 B2 | 11/2007 | Tan et al. | |
| 7,538,326 B2 | 5/2009 | Johnson et al. | |
| 7,586,971 B2 | 9/2009 | Takeda | |
| 8,258,925 B2 * | 9/2012 | Lam et al. | 340/10.1 |
| 2001/0016022 A1 * | 8/2001 | Taniguchi et al. | 375/371 |
| 2002/0180869 A1 * | 12/2002 | Callison et al. | 348/203 |
| 2004/0075624 A1 * | 4/2004 | Tegreene et al. | 345/7 |
| 2004/0240866 A1 | 12/2004 | Ramsbottom | |
| 2006/0176535 A1 * | 8/2006 | Kandori et al. | 359/196 |
| 2006/0255243 A1 | 11/2006 | Kobayashi et al. | |
| 2007/0103752 A1 * | 5/2007 | Kandori et al. | 359/196 |
| 2008/0316560 A1 * | 12/2008 | Kandori et al. | 359/199 |
| 2009/0059325 A1 * | 3/2009 | Sakaue | 358/513 |

(Continued)

OTHER PUBLICATIONS

"Symbol Laser Projection Display (LPD): A Miniature, High Resolution Projection Engine", Retrieved at << http://www.techworld.com/cmsdata/whitepapers/4520/WP-LPD.pdf >>, Jun. 2006, pp. 4.

*Primary Examiner* — Lin Ye
*Assistant Examiner* — Euel Cowan
(74) *Attorney, Agent, or Firm* — Alleman Hall McCoy Russell & Tuttle LLP (57) ABSTRACT

A method for displaying or capturing an image comprises directing an illumination beam onto a mirror of a highly resonant, mirror-mount system and applying a drive signal to a transducer to deflect the mirror. In this method, the drive signal has a pulse frequency approaching a resonance frequency of the mirror-mount system. The method further comprises reflecting the illumination beam off the mirror so that the illumination beam scans through an area where the image is to be displayed or captured, and, addressing each pixel of the image in synchronicity with the drive signal to display or capture the image.

20 Claims, 9 Drawing Sheets

(56) References Cited

U.S. PATENT DOCUMENTS

| | | |
|---|---|---|
| 2009/0153712 A1 | 6/2009 | Davis |
| 2009/0185133 A1* | 7/2009 | Sakakibara ................. 351/211 |
| 2009/0213052 A1 | 8/2009 | Yamauchi et al. |
| 2010/0045962 A1* | 2/2010 | Keam ............................. 356/3 |
| 2010/0253618 A1* | 10/2010 | Nishigaki et al. ............ 345/156 |

* cited by examiner

SCANNED BEAM DISPLAY AND IMAGE CAPTURE

This application claims priority to U.S. Provisional Application 61/328,951, filed Apr. 28, 2010 and entitled SCANNED BEAM DISPLAY AND IMAGE CAPTURE, the entirety of which is hereby incorporated by reference herein for all purposes.

BACKGROUND

An image may comprise numerous pixels of variable brightness or color. The image may be displayed on a device having redundant display elements and captured on a device having redundant photodetector elements. The redundant display elements may render the brightness or color of each pixel separately; likewise, the redundant photodetector elements may detect the brightness or color of each pixel separately. Such capture and display devices include liquid-crystal displays (LCD's) and photodiode imaging arrays, respectively. With these devices, image fidelity may depend on the uniformity of a large number of redundant elements.

Another way to display or capture an image is to use a non-redundant display or photodetector element, and to make that element scan sequentially through each pixel of the image. In this approach, the image fidelity does not depend on the uniformity of redundant elements, but may depend on how rapidly and reliably the non-redundant element can scan through the image.

SUMMARY

One embodiment of this disclosure provides a method for displaying or capturing an image. The method comprises directing an illumination beam onto a mirror of a highly resonant, mirror-mount system and applying a drive signal to a transducer to deflect the mirror. In this method, the drive signal has a pulse frequency approaching a resonance frequency of the mirror-mount system. The method further comprises reflecting the illumination beam off the mirror so that the illumination beam scans through an area where the image is to be displayed or captured, and, addressing each pixel of the image in synchronicity with the drive signal to display or capture the image.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

The subject matter of this disclosure is now described by way of example and with reference to certain illustrated embodiments. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
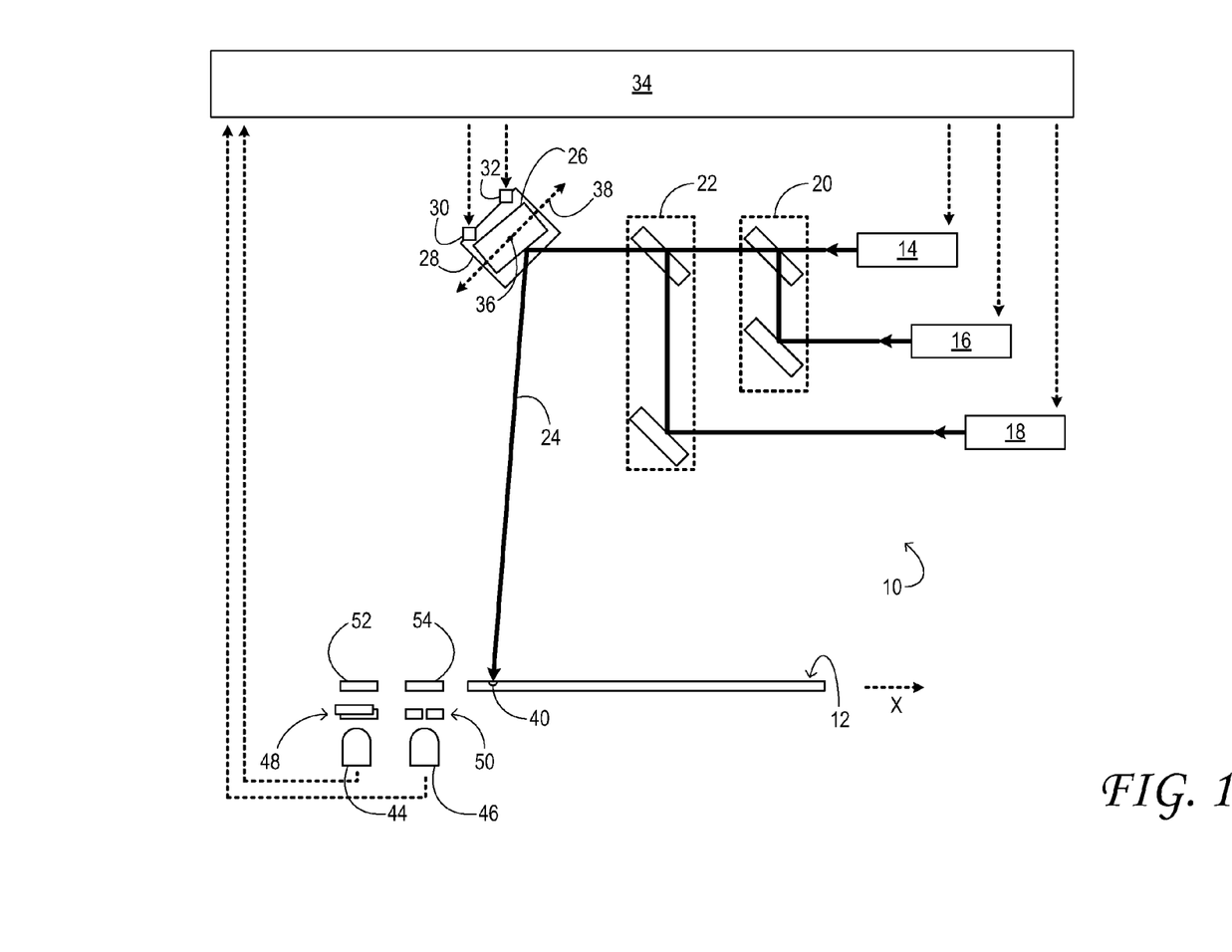
FIG. 1 schematically shows a plan view of a scanned-beam system in accordance with an embodiment of this disclosure.

FIG. 1 schematically shows a plan view of scanned-beam system 10 in one embodiment. The scanned-beam system is arranged opposite display area 12 and is configured to form a display image on the display area. The display area may be an interior or exterior wall, a projection screen, or virtually any non-specularly reflective surface.

It will be noted that the images displayed and captured in the various embodiments of this disclosure may be received, transmitted, or stored in any suitable manner. For example, the images may be received, transmitted, or stored digitally as a sequence of discrete pixels, each pixel having a variable brightness and/or color. Accordingly, the term 'pixel' as used herein conforms to common usage in the art of digital imaging and display. The pixels of an image may be arranged, therefore, in a rectangular array spanning Cartesian coordinates X and Y.

Continuing in FIG. 1, scanned-beam system 10 includes lasers 14, 16, and 18, and beam combiners 20 and 22. The lasers may include diode lasers configured to emit visible light; they may include a red laser, a blue laser, and a green laser, for example. In other embodiments, at least one of the lasers may emit invisible light of an infrared or ultraviolet wavelength. The lasers are arranged—with respect to the beam combiners, in this example—to direct their emission into a collinear, low-divergence, polychromatic illumination beam 24. In one embodiment, the beam combiners may each include a plane mirror and a plane dichroic reflector. Other embodiments may include only one laser, or more than three. A polychromatic illumination beam may be derived from a single laser beam, for example, by second- or higher-order harmonic generation. To this end, the laser beam may be directed through a non-linear optical material, e.g., a frequency-doubling crystal.

Continuing in FIG. 1, scanned-beam system 10 includes mirror 26, mechanically coupled to mount 28. The mirror may comprise any suitable specular reflector. In one embodiment, the mirror may be substantially circular, having a diameter ranging from 0.1 mm to 10 mm, for high speed scanning of visible wavelengths. It will be understood however, that other ranges of dimensions and other mirror geometries are fully consistent with this disclosure. The mount may be any elastic mounting that supports the mirror and allows the mirror to be deflected about two, distinct rotational axes. The mount may be a flexural mount, for example. In one embodiment, the mirror and mount may embody a highly resonant mechanical system. For instance, the mirror-mount system may exhibit a resonance quality factor of hundreds to tens of thousands. High-Q scanners may reduce the drive power requirement, and may increase the quantitative predictability of the deflection of the mirror. Some ways of providing high Q include enclosing the mirror-mount system in an envelope where air or another gas is contained at reduced pressure. In one embodiment, a gas having a lower viscosity than air may be contained in the envelope. In these and other embodiments, the silicon structure of the mirror-mount system itself may be adapted to achieve high resonance. Further, the mirror-mount system may comprise flexure materials that exhibit highly reversible deformation, also leading to high Q.

FIG. 1 shows first transducer 30 and second transducer 32 operatively coupled to controller 34. The first and second transducers are configured to deflect the mirror about first rotational axis 36 (oriented normal to the plane of the drawing) and second rotational axis 38, respectively. The first and second rotational axes are not parallel to each other, and in some embodiments may be orthogonal, as shown in FIG. 1. In the embodiments illustrated herein, a single mirror situated on a dual-axis mount is deflected about orthogonal rotational axes. In other embodiments, the same effect can be achieved using two mirrors arranged in series, each mirror situated on a single-axis mount. Further, the mirror-mount system may highly resonant with respect to deflection about one of the rotational axes—e.g., the faster axis—and less resonant with respect to deflection about the other rotational axis. In one embodiment, the mirror-mount system may be non-resonant with respect to deflection about the slower axis. Further still, at least some of this disclosure may be relevant to configurations in which the mirror-mount system is non-resonant with respect to deflection about both axes.

In the embodiments contemplated herein, the first and second transducers may include piezoelectric, electromagnetic, or electrostatic transducers, for example. Controller 34 is configured to apply a drive signal to each of the transducers—i.e., to vary a driving voltage or current to the transducers—and thereby influence the deflection of mirror 26. In one particular embodiment, transducers 30 and 32 are electrostatic transducers, which impart a deflective force to the mirror when a high voltage is applied across closely-spaced plates or combs. In one embodiment, the plate or comb configuration may be at least partly asymmetric. The asymmetry may be induced by mechanical noise moving the configuration out of a symmetric state. Lacking ferromagnetic or piezoelectric materials, electrostatic transducers can be manufactured using standard microelectromechanical systems (MEMS) processing, and are therefore compatible with relatively low-cost scanned-beam systems.

As shown in FIG. 1, illumination beam 24 is reflected off mirror 26 en route to display area 12. Accordingly, controlling the deflection of the mirror about first rotational axis 36 and second rotational axis 38 allows the illumination beam to be 'steered' within the display area to illuminate a point-like locus of the display area. More precisely, controlling the deflection of the mirror about the first rotational axis determines the position of illuminated locus 40 along first translational axis X; controlling the deflection of the mirror about the second rotational axis determines the position of the illuminated locus along second translational axis Y (oriented normal to the plane of the drawing). The first and second translational axes are generally not parallel to each other, and in some embodiments may be orthogonal.

To enable scanned-beam system 10 to display an image, controller 34 is configured to address each pixel of the image in synchronicity with the drive signals applied to transducers 30 and 32 while the illumination beam is scanning display area 12. For scanned-beam display, addressing each pixel of the image comprises adjusting an intensity of illumination beam 24 for each pixel of the image. Accordingly, in the embodiment shown in FIG. 1, lasers 14, 16, and 18 are operatively coupled to controller 34. The controller is configured to supply a modulated drive current to each laser to modulate the emission amplitude thereof.

Figure 2:
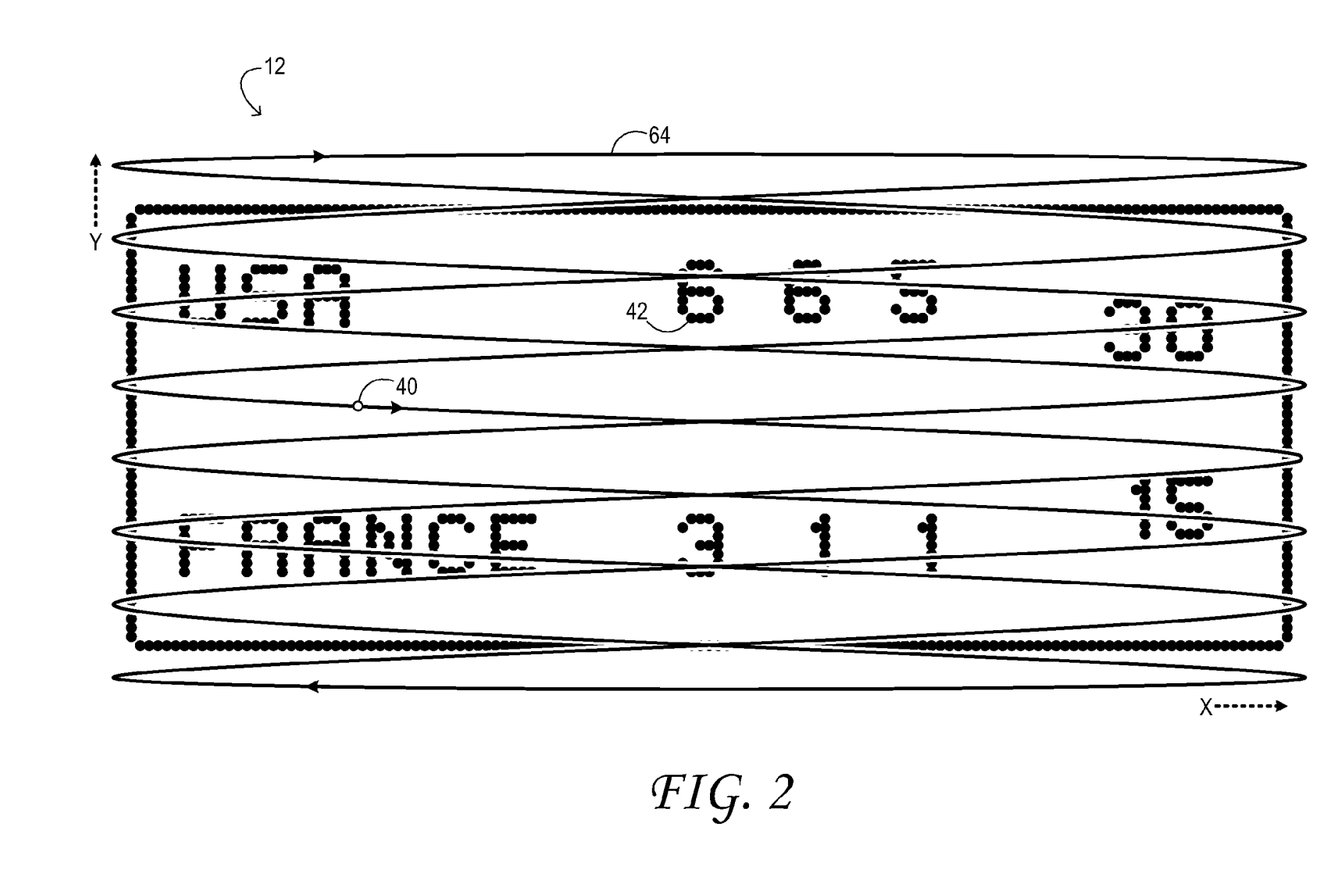
FIG. 2 schematically shows a scanned display area in accordance with an embodiment of this disclosure.

FIG. 2 shows display area 12 rotated with respect to the view of FIG. 1 and oriented as it would normally be viewed. The display area comprises an array of pixels 42 that span translational axes X and Y. A display image is formed in the display area by delivering, in the manner described above, an appropriate illumination intensity of each wavelength of illumination beam 24 to each pixel.

Methods described hereinafter provide further detail on the manner in which the deflection of mirror 26 and the modulation of illumination-beam intensity may be synchronized. In some methods, an intensity of light delivered to display area 12 is detected and used to improve the synchronization. For example, a phase delay for the deflection of mirror 26 relative to a drive pulse applied to transducer 30 or 32 may be determined by detecting the intensity of light reaching the display area in real time. Therefore, returning now to FIG. 1, scanned-beam system 10 includes photodetectors 44 and 46 arranged near display area 12. The photodetectors may each comprise a photodiode or photomultiplier and may be unlensed to detect light over a broad range of angles. In the embodiment shown in FIG. 1, light from illumination beam 24 reaches photodetector 44 through horizontal aperture slit 48; it reaches photodetector 46 through vertical aperture slit 50. Accordingly, photodetector 44 is responsive to the X coordinate of illuminated locus 40 and unresponsive to the Y coordinate; photodetector 46 is responsive to the Y coordinate of the illuminated locus and unresponsive to the X coordinate. In the embodiment shown in FIG. 1, light is transmitted to the photodetectors through filters 52 and 54, which may include interference or color filters, for example. In this manner, the photodetectors may be configured to detect narrow band light of any wavelength of the illumination beam. In the illustrated embodiment, the photodetectors, filters, and aperture slits are arranged at one edge of the display area to receive light directly from the illumination beam; in other embodiments, the photodetectors may be arranged at adjacent edges of the display area or within the display area. In other embodiments, the photodetectors, filters, and aperture slits may be arranged opposite the display area and configured to receive reflected light from the display area. In still other embodiments, light from the illumination beam may be received at one or more mirrors that reflect the light to suitable slits, filters, and/or detectors. In some cases, the shape of the mirror itself can be used to emulate the function of a slit. Further, some configurations fully consistent with this disclosure may lack the filters, the aperture slits, and/or the photodetectors.

Figure 3:
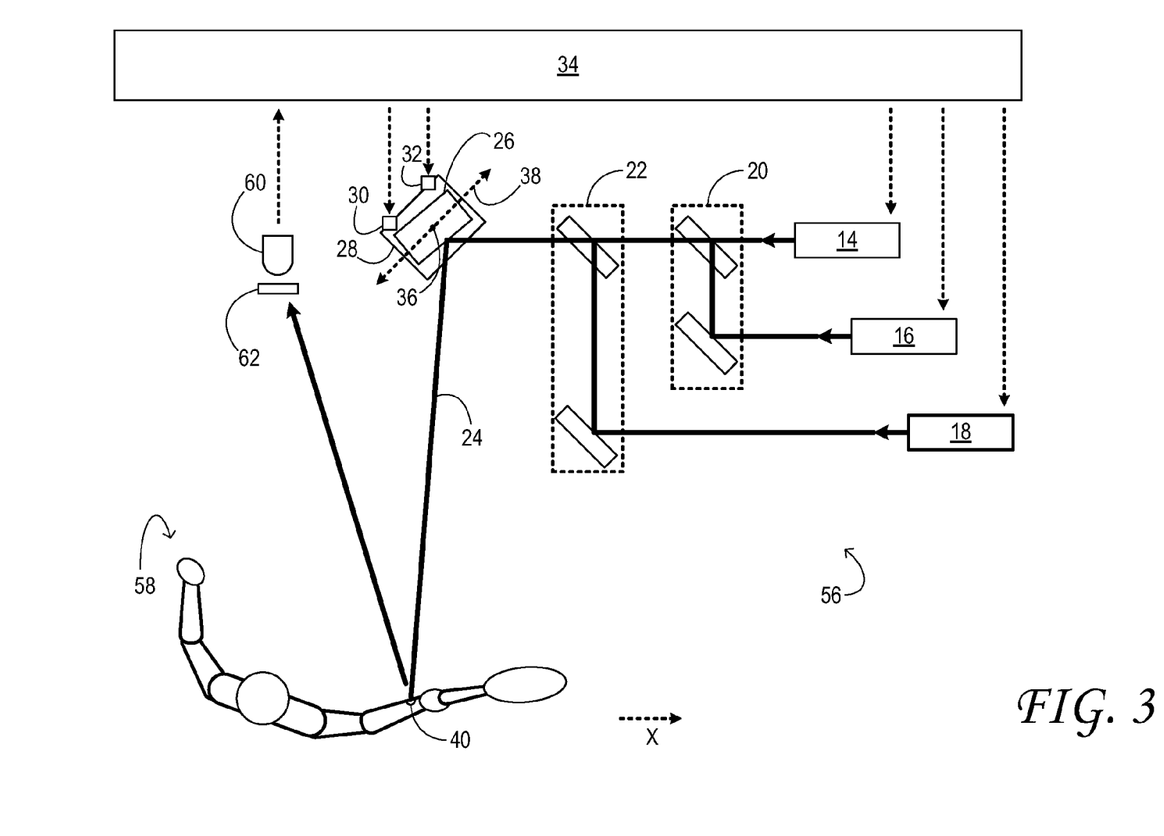
FIG. 3 schematically shows a plan view of another scanned-beam system in accordance with an embodiment of this disclosure.

FIG. 3 schematically shows a plan view of another scanned-beam system 56 in one embodiment. Scanned-beam system 56 is arranged opposite subject 58 and is configured to capture an image of the subject. For image capture, at least one photodetector 60 (substantially equivalent to photodetectors 44 and 46 above) is arranged opposite the subject and is configured to receive light from illumination beam 24 reflected off the subject. In the embodiment illustrated in FIG. 3, filter 62 is arranged in front of photodetector 60 to limit the response of the photodetector to one or more wavelengths of the illumination beam.

In scanned-beam system 56, illumination beam 24 is scanned over subject 58 just as it was scanned over display area 12 in the previous embodiment. Accordingly, transducers 30 and 32 are configured to deflect mirror 26 so that the illumination beam scans through an area where an image of the subject is to be captured. Meanwhile, controller 34 is configured to address each pixel of the image in synchronicity with the drive signal. For scanned-beam image-capture, addressing each pixel of the image comprises registering a detected intensity of light from the illumination beam for each pixel of the image as the illumination beam scans over the subject.

Figure 4:
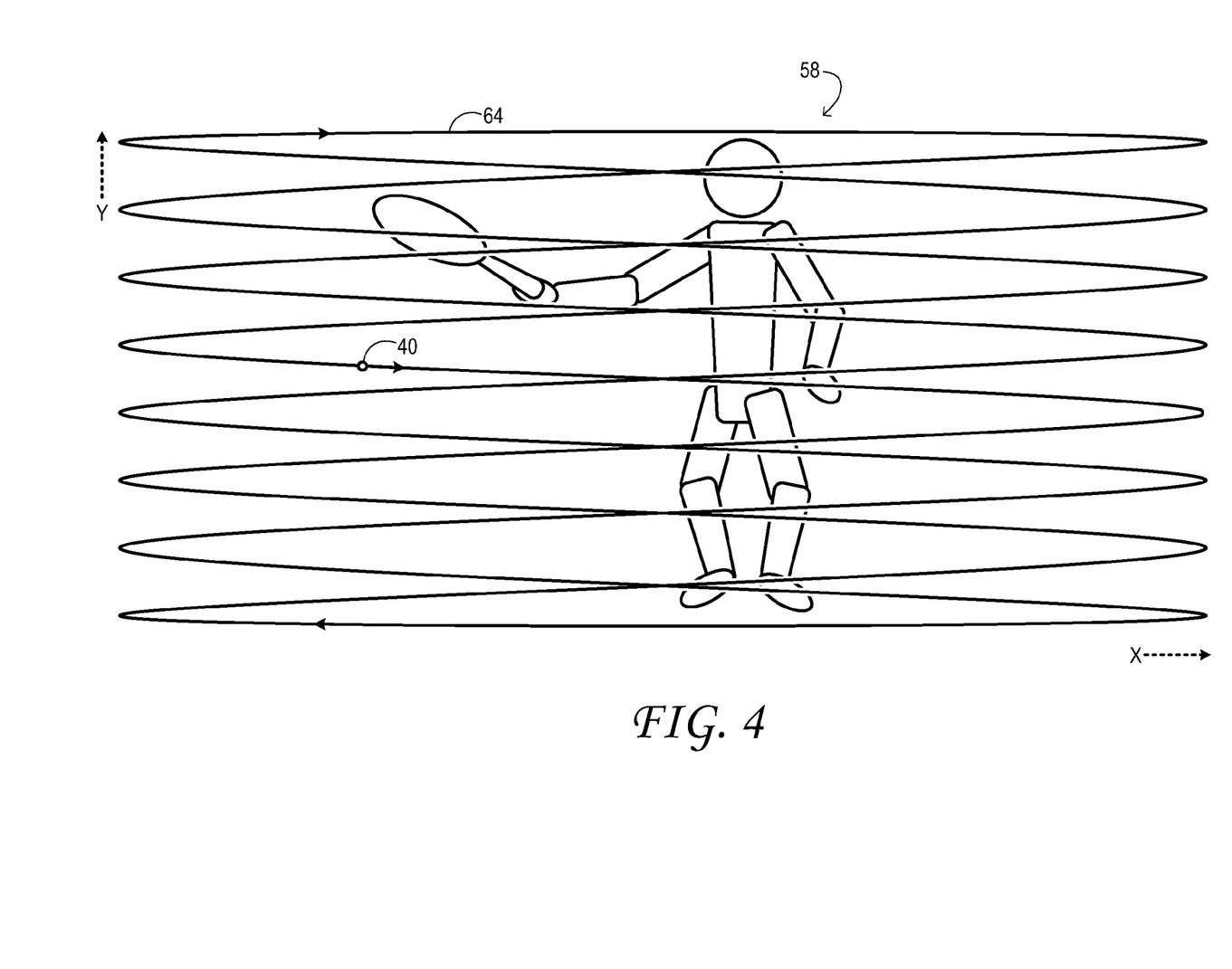
FIG. 4 schematically shows a captured image of a subject in accordance with an embodiment of this disclosure.

In this configuration, only a single point-like locus 40 of the subject is illuminated at any given time. When the illumination beam scans over a dark part of the subject, little or no light from the illumination beam will reflect back to photodetector 60; when it scans over a bright part of the subject, more light will be reflected back to the photodetector. FIG. 4 shows the subject rotated with respect to the view of FIG. 3 and oriented as it would appear in the captured image.

By using lasers of different wavelengths, scanned-beam system 56 can be made responsive to the coloration of subject 58. In one embodiment, lasers of three different visible wavelengths may be operated continuously; a plurality of photodetectors fitted with color or interference filters may be used to detect the light reflected from the subject. In another embodiment, one or more photodetectors may be responsive to the full wavelength range of the illumination beam; the lasers could be modulated, however, so that color information is encoded temporally and is extractable from the phase of the photodetector output. At the cost of spatial resolution, modulation of the lasers may also be used to improve the signal-to-noise ratio for detecting the reflected light, via lock-in amplification, for example. At the cost of temporal resolution, signal to noise ratio may also be improved by averaging frames collected.

In scanned-beam display and image-capture applications alike, a high frame rate and a high resolution are generally desirable. For display, the pixels of the image can be scanned rapidly enough so that the human eye perceives a static image; for image capture, scanning can be rapid at least on the timescale of the motion of the subject. In one embodiment, therefore, a scanned beam system as described herein may be configured to capture sixty frames per second at a resolution of one million pixels per frame. Naturally, other frame rates and resolutions are contemplated as well.

With scanned-beam systems 10 and 56, the frame rate is determined by the rate of change of the deflection of mirror 26, and the resolution is determined by the range of the deflection. To a first approximation, mirror 26 and mount 28 resemble a driven mass-spring system. In such a system, discontinuous or abrupt acceleration of the mirror may require excessive actuator force. As a result, rastering the illumination beam through sharp corners—like the electron beam of a cathode ray tube—may be impractical at frequencies that can achieve a suitable frame rate. However, the mirror may be accelerated sinusoidally at suitable frequencies and amplitudes. This may be accomplished by applying pulse-train drive signals to transducers 30 and 32, the frequencies of the pulse trains being carefully chosen to drive the system close to its resonance frequencies.

When transducers 30 and 32 are driven in this manner, illumination beam 24 scans the subject or display area at a periodically changing velocity along a Lissajous figure. To illustrate some features of the scan, FIGS. 2 and 4 show illuminated locus 40 tracing out Lissajous FIG. 64. Naturally, the illuminated locus may trace out a much higher-order Lissajous figure for suitably high resolution (vide infra).

To optimize the frame rate, the resonance frequencies of the mirror-mount system can be as high as possible. Reducing the mass of mirror 26 will increase the resonance frequencies, but reducing the diameter of the mirror may lower the image resolution. This is because any light beam is subject to diffraction when reflected off a mirror. Such diffraction may diverge illumination beam 24 by $k*\lambda/d$ radians—where d is the diameter of the mirror, $\lambda$ is the wavelength of the illumination, and k is a constant near unity. Divergence of the illumination beam causes illuminated locus 40 to be larger and the image resolution to be lower.

Another way to increase the resonance frequency of a mirror-mount system is to increase the stiffness of mount 28. This approach could potentially reduce the range of deflection of the mirror for a given applied force, again lowering the number of resolved pixels. However, the reduction in deflection range may be offset by simultaneously increasing the resonance quality factor Q of the mirror-mount system, i.e., by making the system more resonant. In this manner, it is possible to drive the mirror through a larger range of angles using less applied force. Making the mirror-mount system more resonant is beneficial especially in embodiments where transducer actuator force is inherently low—with electrostatic transducers, for example.

The high-Q approach outlined above can significantly increase the number of resolved pixels of a scanned-beam display or image-capture system at a given frame rate. For still greater advantage, an adaptive strategy for driving transducers 30 and 32 may be used. To ensure high-Q operation in one embodiment, each transducer is driven very close to a resonance frequency of the mirror-mount system—to within tens to hundreds of parts per million (ppm), for example. However, the resonance frequencies themselves are subject to the same or greater variance due to manufacturing tolerances and temperature changes. Therefore, a programmable drive clock may be used to initiate the drive signals to the transducers in accordance with the present disclosure.

Figure 5:
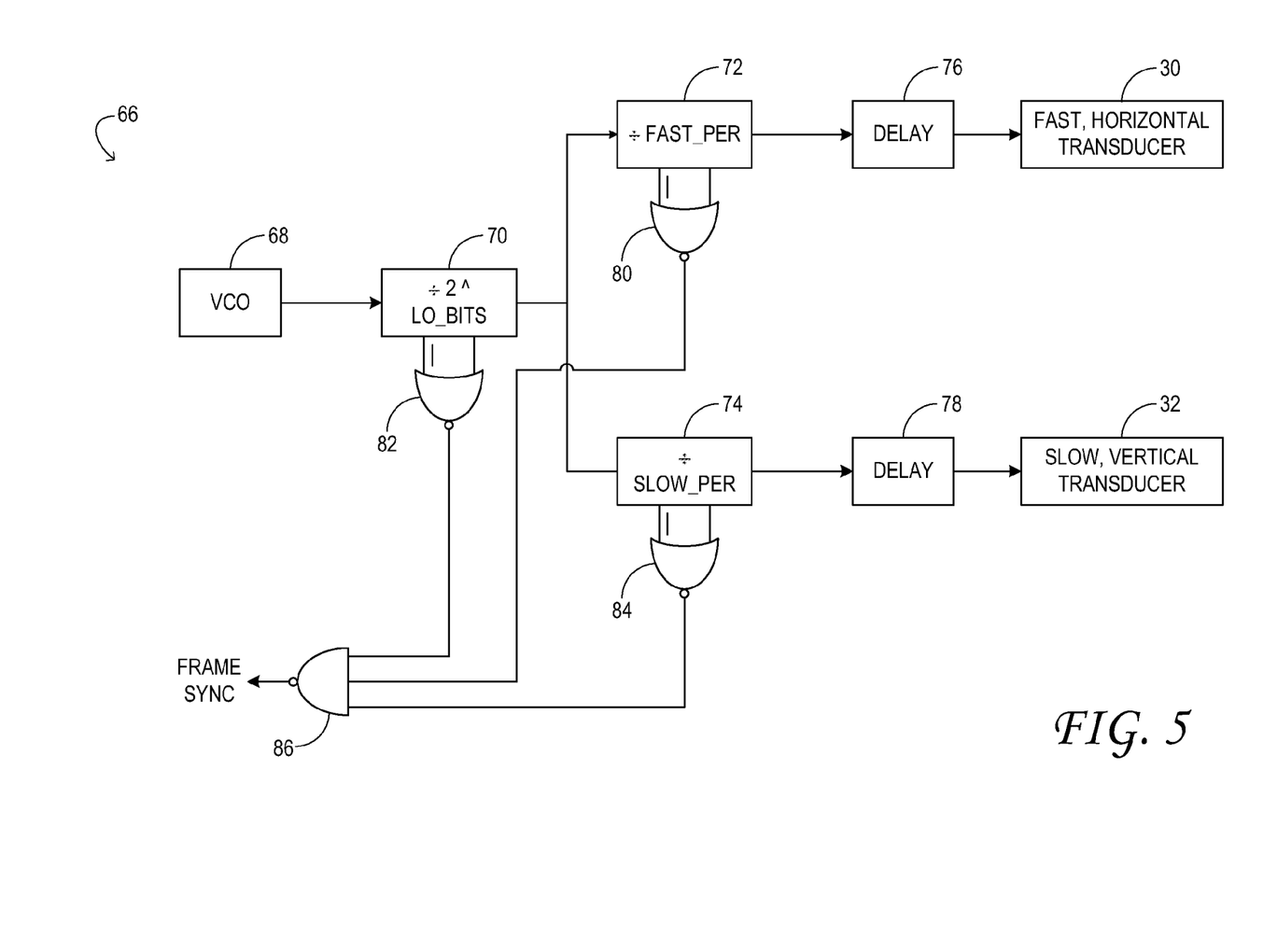
FIG. 5 is a schematic diagram of a timing circuit for providing drive signals to a pair of mirror-actuating transducers in accordance with an embodiment of this disclosure.

FIG. 5 schematically shows an example timing circuit 66 for providing drive signals to transducers 30 and 32 in one embodiment. In the illustrated timing circuit, the pulse trains are derived from a fast clock by integer division. This approach does not introduce phase noise and can be used instead of techniques that dither the clock phase to effect non-integer division. It will be noted that phase noise—because of high-Q mirror actuation—brings about amplitude noise in the deflection of the mirror, which may affect image fidelity. Integer division, on the other hand, averages clock jitter over many clock periods, thereby reducing phase noise in the divided pulse train relative to that of the fast clock.

FIG. 5 shows pixel clock 68, a programmable clock having a frequency equal to the desired pixel frequency f_pixel. Assuming roughly one thousand pixels per horizontal line, this frequency may be in the tens of megahertz. All other clocks in timing circuit 66 run at integer submultiples of f_pixel. In the embodiment shown in FIG. 5, the pixel clock comprises a voltage-controlled oscillator (VCO) configured to generate a pulse train of adjustable frequency. By adjusting the control voltage of the VCO, the frequency can be set to a precision of 7 ppm or higher, for example.

In other embodiments, the pixel clock may include a very fast constant-frequency clock followed by a programmable frequency divider. The very fast constant frequency clock could be generated from a crystal oscillator using a third-overtone crystal, or a phase-locked loop (PLL), for example.

FIG. 5 shows first (e.g., fast, horizontal) transducer 30 and second (e.g., slow, vertical) transducer 32. Note that the first and second transducers may also be arranged in reverse, with the vertical axis being scanned faster than the horizontal axis. The pulse train from pixel clock 68 is divided by two integers, fast_tot and slow_tot, to yield drive pulses for the first and second transducers, respectively. When these transducers are clocked at frequencies of f_pixel/fast_tot, and f_pixel/slow_tot, respectively, illumination beam 24 will trace out a Lissajous figure having a frequency $$f\_pixel/(2*LCM(fast\_tot, slow\_tot)).$$

In the expression above, LCM (fast_tot,slow_tot) denotes the least common multiple of the bracketed integers. The extra factor of two in the denominator results from the fact that the mechanical frequencies of oscillation of the mirror are half of the drive frequencies applied to the transducers when the transducers are the symmetrical comb drive type. This feature also introduces a 180 degree phase uncertainty in actuating the mirror, such that every time the pixel clock starts up, the mirror has a fifty percent chance of being deflected in reverse, for each transducer. This event would cause the image to be displayed or captured as a mirror image.

In the embodiment shown in FIG. 5, fast_tot and slow_tot are chosen to be multiples of a common integer power of two, i.e., $$fast\_tot = (2^{(lo\_bits)}) * fast\_per$$

$$slow\_tot = (2^{(lo\_bits)}) * slow\_per,$$

where fast_per and slow_per are relatively prime integers—viz., they share no integer factor other than the number one. Factoring out the integer power of two increases the likelihood that suitable, relatively prime integers may be chosen, which simplifies frame synchronization as further described below. In this embodiment, the Lissajous figure that illumination beam 24 traces out will have a period $$frame\_per = 2*(2^{(lo\_bits)})*fast\_per*slow\_per.$$

To enact the indicated frequency division, timing circuit 66 includes three digital counters configured as clock dividers. Lo-bits counter 70 is clocked directly by pixel clock 68 and divides the pulse frequency of the pixel clock by $2^{(lo\_bits)}$. Fast period counter 72 and slow period counter 74 are clocked by the lo-bits counter and divide the pulse frequency of the lo-bits counter by fast_per and slo_per, respectively.

As shown in FIG. 5, transducers 30 and 32 are not driven directly by counter dividers 72 and 74. Rather, the output pulse trains of fast period counter 72 and slow period counter 74 are fed through programmable delay lines 76 and 78. The programmable delay lines apply adjustable time delays to the pulse trains, which compensate for phase delays between the electrical excitation of the transducers and the deflection of the mirror. In one embodiment, each adjustable delay of the programmable delay lines comprises an adjustable integer number of periods of pixel clock 68. In terms of the parameters defined above, timing circuit 66 will cause illumination beam 24 to trace out a Lissajous figure given by:

$$x(t) = \sin(2*pi*(f\_pixel/(slow\_per*2^{(lo\_bits)}))*t + phi\_x), \text{ and}$$

$$y(t) = \sin(2*pi*(f\_pixel/(fast\_per*2^{(lo\_bits)}))*t + phi\_y),$$

where phi_x and phi_y are the effective phase delays corresponding to the adjustable time delays of the programmable delay lines.

In this embodiment, a new frame starts being written or acquired when $$t = k*frame\_per/f\_pixel,$$

for any integer k≥0. At this instant, lo-bits counter 70, fast period counter 72, and slow period counter 74 have each just wrapped, and exhibit an accumulated count of zero. This condition is a consequence of the fact that fast_per and slow_per were chosen to be relatively prime. Accordingly, timing circuit 66 includes logic gates 80 through 86, which provide a synchronization pulse when accumulated count of each of the above counter dividers is zero. Because transducers 30 and 32 divide by two, however, every other output pulse of the logic gates may be ignored in determining when to trigger frame synchronization. Whether odd or even pulses are ignored is arbitrary, in view of the 180 degree phase uncertainty on startup.

The example configurations described above enable various methods for displaying or capturing an image using a scanned-beam system. Accordingly, some such methods are now described, by way of example, with continued reference to above configurations. It will be understood, however, that the methods here described, and others fully within the scope of this disclosure, may be enabled via other configurations as well.

Figure 6:
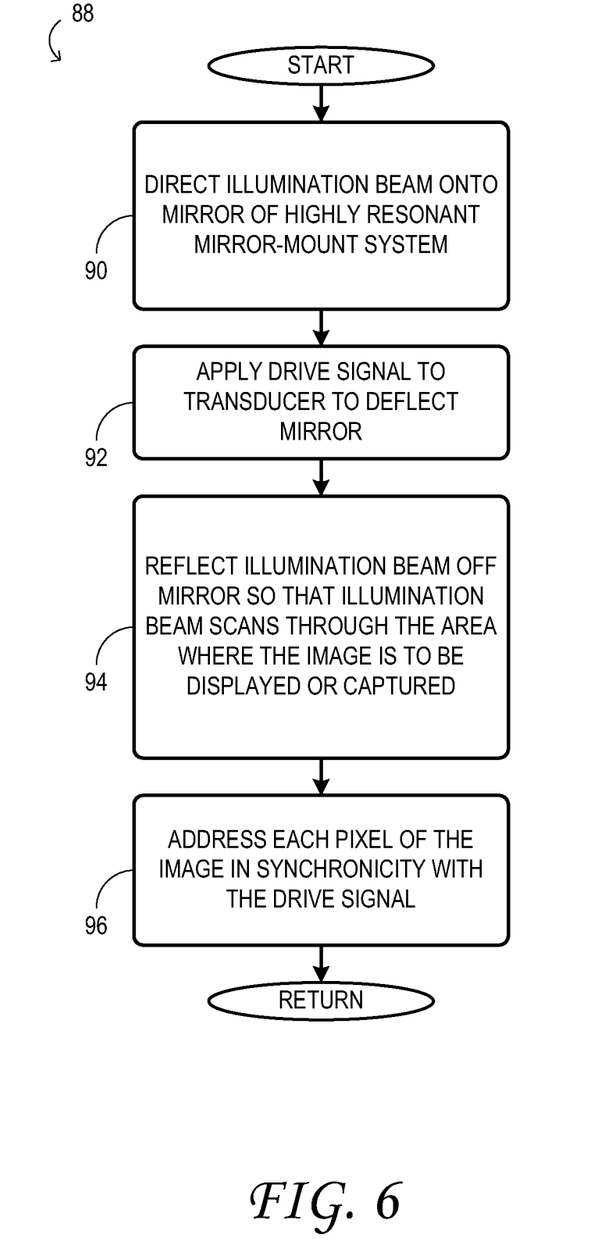
FIG. 6 illustrates a method for displaying or capturing an image in accordance with an embodiment of this disclosure.

FIG. 6 illustrates an example method 88 for displaying or capturing an image in one embodiment. At 90, an illumination beam is directed onto a mirror of a highly resonant mirror-mount system, as described hereinabove. In one embodiment, the mirror-mount system may have a resonance quality factor Q above one hundred. At 92, a drive signal is applied to a transducer to deflect the mirror. The drive signal may have a pulse frequency approaching a resonance frequency of the mirror-mount system. In one embodiment, the pulse frequency of the drive signal may approach a resonance frequency of the mirror-mount system to within one hundred parts per million. Accordingly, applying the drive signal may comprise adjusting the pulse frequency of the drive signal to track the resonance frequency of the mirror-mount system as the resonance frequency varies. The resonance frequency may vary due to manufacturing tolerances, or due to the uncertain temperature of the mirror, as noted below. The method then advances to 94, where the illumination beam is reflected off the mirror so that the illumination beam scans through an area where the image is to be displayed or captured. At 96, each pixel of the image is addressed in synchronicity with the drive signal. Following 96, the method returns.

In embodiments directed to image display, addressing each pixel of the image at 96 comprises adjusting an intensity of the illumination beam for each pixel of the image as the illumination beam scans through the display area. In embodiments directed to image capture, addressing each pixel of the image comprises registering a detected intensity of light from the illumination beam for each pixel of the image as the illumination beam scans over a subject, or through an area where a subject is located. Illustrated in FIGS. 7 through 9 and described below are further, more particular aspects of the above method.

Figure 7:
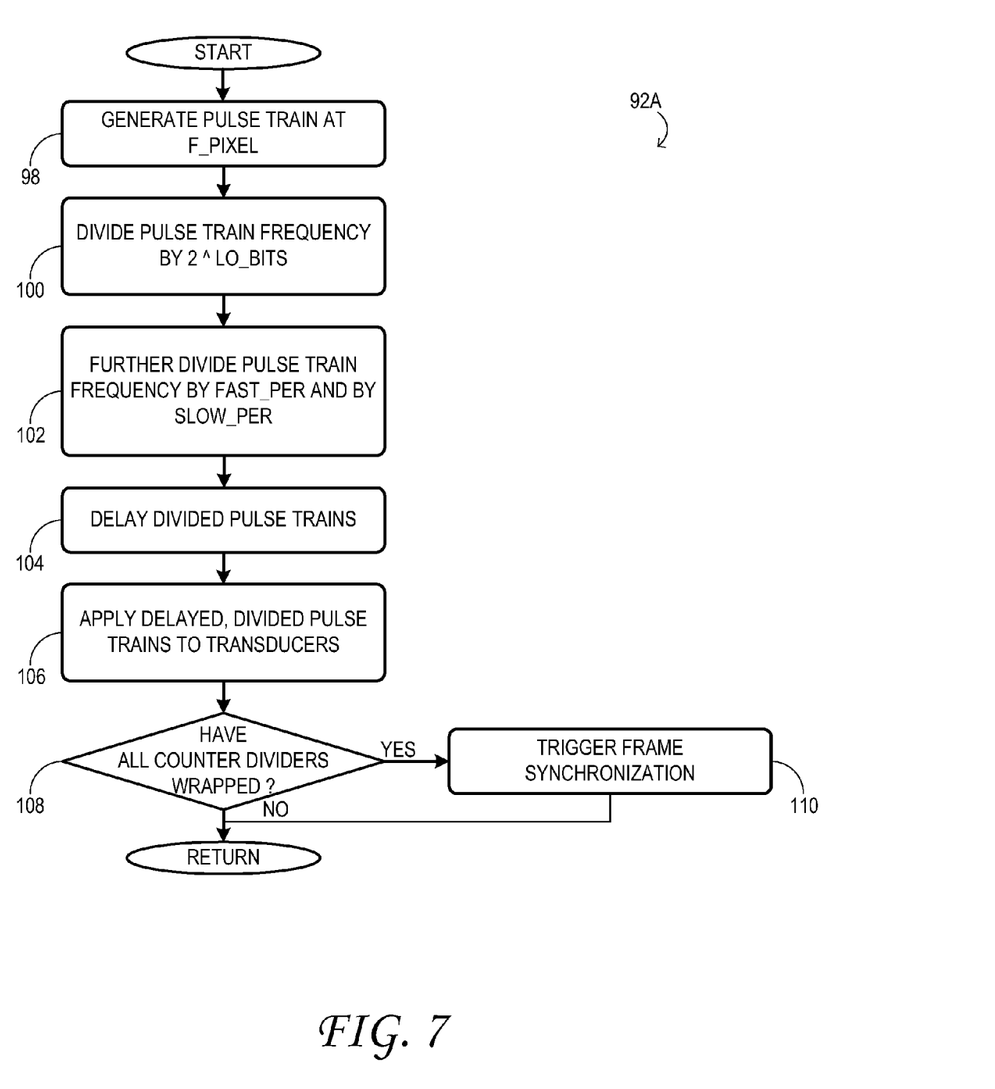
FIG. 7 illustrates a method for applying drive signals to a pair of mirror-actuating transducers in accordance with an embodiment of this disclosure.

FIG. 7 illustrates an example method 92A for applying a drive signal to a pair of transducers to drive a mirror, in one embodiment. The method may be enabled by various configurations, such as timing circuit 66 described above. At 98, a pulse train of frequency f_pixel is generated. At 100, the frequency of the pulse train is divided by $2^{lo\_bits}$. At 102, the frequency of the pulse train is further divided by fast_per and by slow_per. At 104, both of the divided pulse trains are delayed to compensate for the phase delays of mirror actuation. It is possible to measure the phase delays for a particular mirror, and to pre-calibrate the scanned-beam system using the measured values as constants. However, a high-Q system driven near resonance will exhibit a phase that varies strongly with changes in driving frequency, and, with changes in resonance frequency. Since the resonance frequency is a function of temperature, a very small change in the mirror's temperature will produce a large change in the phase delay. The phase delay of the mirror is important because the scanned-beam system effectively sweeps through four images: a first image when the beam is moving to the left and up, a second image when moving to the left and down, a third image when moving to the right and up, and a fourth image when moving to the right and down. An incorrect estimate of the phase delay causes misalignment among those four images, so that each pixel breaks apart into four. In view of these concerns, the methods that employ an adjustable phase delay are described and illustrated hereinafter.

Continuing in FIG. 7, method 92A advances to 106, where the delayed, divided pulse trains are applied to the transducers to cause sinusoidal deflection of the mirror. At 108, it is determined whether the counter dividers that divide the pulse train have just wrapped. If the counter dividers have just wrapped—e.g., if the counts of the counter dividers are all clear—then the method advances to 110, where a frame synchronization event is triggered. Following this step, or if it was determined at 108 that all of the counter dividers have not just wrapped, then the method returns.

Because the intensity of illumination beam 24 may vary during image display or image capture, the amount of heat that the illumination beam delivers to mirror 26 may vary as well, causing the mirror heat up or cool down. The ambient temperature as well may influence the temperature of the mirror. Any such temperature variations can affect not only the resonance frequency of the mirror-mount system, but also the phase delays for mirror deflection relative to the transducer drive signals. Therefore, to ensure that each pixel of the image is addressed in synchronicity with the drive signals, such addressing may be delayed by an adjustable amount relative to a pulse of the drive signal. Further, the adjustable amount may be based on the temperature of the mirror. It is convenient to subsume this adjustable delay amount into the time delay applied at 104 of the above method. Accordingly, the methods illustrated in FIGS. 8 and 9 provide for the adjustment phase delay parameters in response to mirror temperature.

Figure 8:
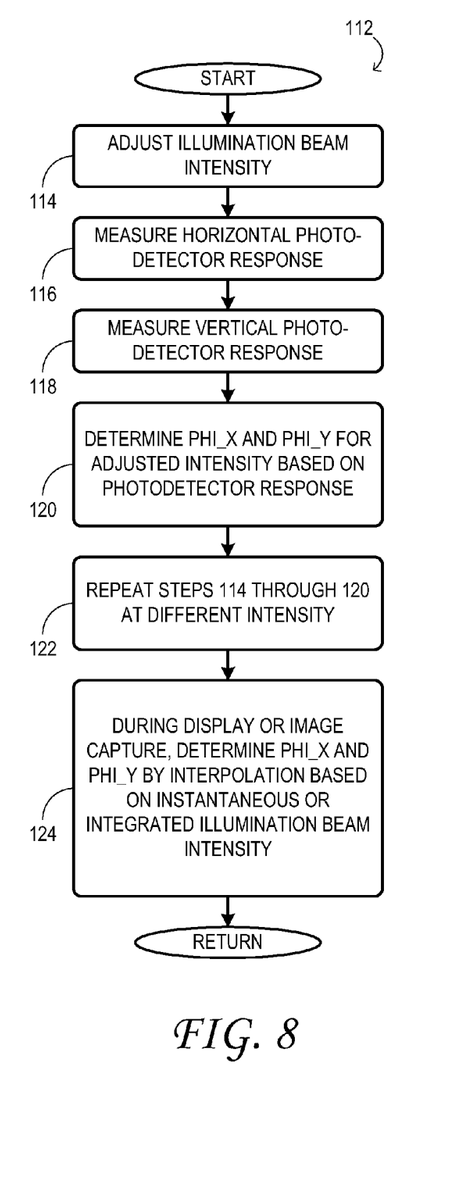
FIGS. 8 and 9 illustrate methods for adjusting phase delay parameters for drive signals applied to a pair of mirror-actuating transducers in accordance with different embodiments of this disclosure.

FIG. 8 illustrates an example method 112 for adjusting phase delay parameters that delay divided pulse trains in transducer drive methods such as method 92A described above. In method 112, an adjustable delay amount is determined based on an intensity of the illumination beam by interpolation among a plurality of predetermined delay amounts corresponding to preset illumination-beam intensities.

At 114 of method 112, the intensity of the illumination beam is adjusted. At 116, the response of a photodetector sensitive to the horizontal position of illuminated locus 40 is measured. At 118, the response of a photodetector sensitive to the vertical position of the illuminated locus is measured. In one embodiment, the horizontally and vertically responsive photodetectors provide a pulse-like signal as the illumination beam crosses them. Accordingly, the method may comprise registering the clock count when the signal reaches its maximum, and using the registered clock count as a measurement of phase. For example, the peak of the signal may be detected. Otherwise, a threshold may be set at a suitable value below the peak—at one half of the peak, for example—and the phase can be measured based on the time when the signal rises above the threshold. The method then advances to 120, where phase delay parameters phi_x and phi_y, as defined above, are determined for the currently adjusted illumination beam intensity, based on the measured photodetector responses. At 122, steps 114 through 120 are repeated at a different illumination-beam intensities. In one embodiment, the phase delay parameters are measured with one or more lasers of the illumination beam fully off, with one or more lasers of the illumination beam fully on, and at multiple intensity levels therebetween. The method then advances to 124, where, during image display or image capture, running values of the phase delay parameters are determined by interpolation based on the actual intensity of the illumination beam. The actual intensity used in the interpolation may be an instantaneous intensity or it may be averaged over a suitable integration period. Thus, method 112 provides an open-loop approach for adjusting the phase delays applied to transducers 30 and 32 in response to the variable intensity of the illumination beam. The method illustrated in FIG. 9 provides an analogous closed-loop approach.

Figure 9:
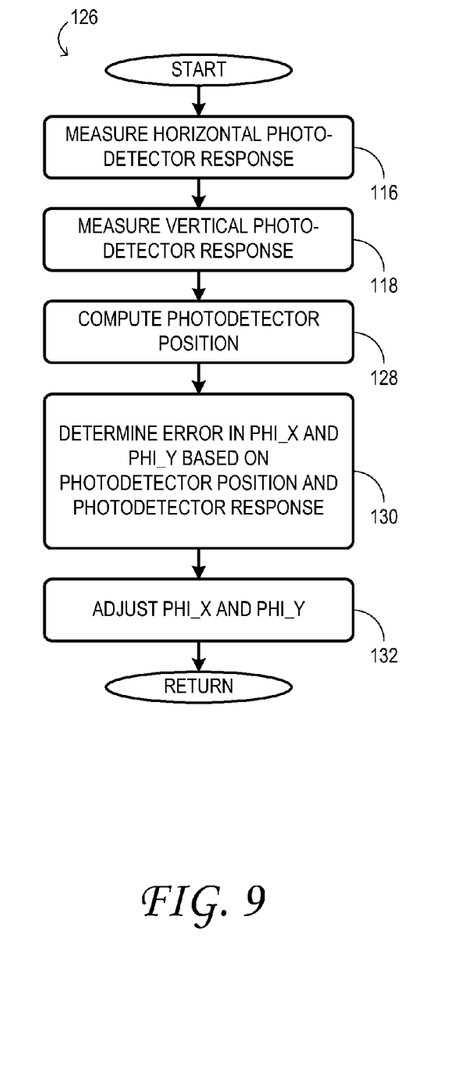

FIG. 9 illustrates another example method 126 for adjusting phase delay parameters that delay divided pulse trains in transducer drive methods such as method 92A described above. At 116 of the method, the response of a photodetector sensitive to the horizontal position of illuminated locus 40 is measured. At 118, the response of a photodetector sensitive to the vertical position of the illuminated locus is measured. The method then advances to 128, where the coordinates of the photodetector are computed based on the pulse signature of the photodetector responses. In the configurations described hereinabove, each photodetector generates two pulses per period of the mirror, one as the beam scans over the photodetector in an increasing X or Y direction, and another as the beam scans back over the photodetector in the decreasing direction. If the time between pulses is equal to the X or Y scan period, then the photodiode is positioned in the center of the scan. If the time is short, then it is close to one of the scan limits. In between, it varies as the inverse sine of the scan coordinate.

Continuing in FIG. 9, method 126 advances to 130, where the errors of the phase delay parameters phi_x and phi_y are determined based on photodetector position and photodetector response. At 132, the running values of phi_x and phi_y are adjusted. In one embodiment, a smaller correction may be applied to the to the phase parameters than the values just determined; this approach avoids overshoot and causes the phase error to vanish exponentially with time.

In one embodiment of the above method, controller 34 can apply constant illumination at the edges of the scan at one or more visible wavelengths. Accordingly, the adjustable amount may be determined by detecting light from the illumination beam at an angle where the light is unmodulated, and synching an intensity of the detected light to the drive signal. In another embodiment, the controller can apply constant illumination anywhere in the display area using an invisible, unmodulated wavelength of the illumination beam. Here, the adjustable amount may be determined by detecting light of an unmodulated wavelength from the illumination beam and synching an intensity of the detected light to the drive signal.

Still other embodiments may combine aspects of the methods illustrated above. For example, an open-loop estimate of the phase parameters may be used in conjunction with closed-loop refinement. In still other embodiments, open- and/or closed-loop methods may be used to vary the drive frequency—by changing the pixel clock frequency, for example—to achieve a constant mirror phase delay, instead of adjusting the phase delay parameters.

Figure 10:
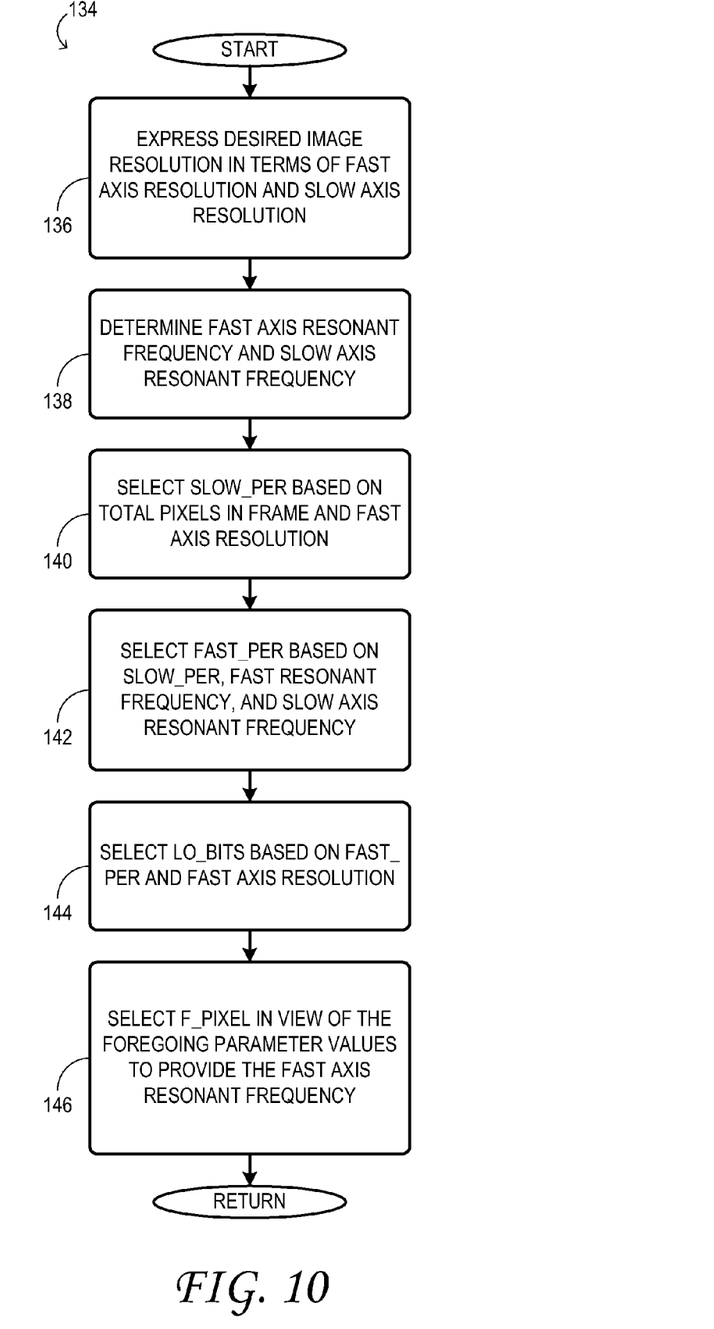
FIG. 10 illustrates a method for systematically selecting parameter values for providing drive signals to a pair of mirror-actuating transducers in accordance with an embodiment of this disclosure.

The configurations and methods described above make reference to various numerical parameters—fast_per, slow_per, lo_bits, f_pixel, for example. FIG. 10 illustrates an example method 134 for systematically selecting suitable values for these parameters. In the illustrated embodiment, the parameter values are selected based on desired properties of the displayed or captured image—fast (vertical) resolution, slow (horizontal) resolution, for example—and on various physical constraints, such as the fast axis resonance frequency and the slow-axis resonance frequency.

At 136 of method 134, the desired image resolution is expressed in terms of the fast axis resolution and the slow axis resolution. At 138, hardware-constrained parameters fast axis resonance frequency and slow axis resonant_ frequency are determined.

Assuming that the fast axis is much faster than the slow axis, the fast axis resolution is given by $$2*\text{fast\_per}*2^{\text{lo\_bits}},$$

and the total number of pixels in the frame is given by $$2*\text{fast\_per}*\text{slow\_per}*2^{\text{lo\_bits}}.$$

Therefore, the slow axis resolution is given by $$(\text{total pixels in frame})/(\text{fast axis resolution})=\text{slow\_per}.$$

At 140, therefore, slow_per is chosen accordingly, based on the desired slow-axis resolution. Then at 142, fast_per is chosen to be an integer relatively prime with respect to slow_per, such that $$\text{fast\_per}/\text{slow\_per}\approx(\text{fast resonance frequency})/(\text{slow res freq}).$$

Because these parameters are integers, the above equation may be satisfied only to an approximation. In some embodiments, the quality of the approximation may be improved when slo_per and fast_per are selected globally to satisfy the above equations. Method 134 then advances to 144, where lo_bits is chosen based on the desired fast axis resolution, and to 146, where f_pixel is finally computed.

Although the foregoing methods make reference to a resonance frequency for the fast (e.g., horizontal) axis and a resonance frequency for the slow (e.g., vertical) axis, this disclosure is also consistent with driving only one of the transducers near resonance, and driving the other one off resonance. In one example embodiment, the fast, horizontal transducer may be driven near resonance, while the slow, vertical transducer may be driven off resonance—e.g., in a sequence of substantially linear steps.

As noted above, the configurations and methods described herein may be used for image display as well as image capture. In some applications, however, it is desirable to display a first image and capture a second image concurrently. In one simple example, an optical touch screen may display a virtual keypad or other information, and concurrently capture an image that defines a user's input; the captured image could include the user's finger or stylus. In another example, a video game system may display information or graphics to a gamer, and concurrently capture an image that encodes a disposition or gesture of the gamer. The video game system may process the captured image to decipher the disposition or gesture and use it as input.

In one embodiment, a scanned-beam display and image capture system is configured to display a first image in an area where a subject is also situated. The system is further configured, as described above, to detect display light reflected off the subject. In this manner, a second image is captured, the second image consisting of a pixel-wise multiplicative product of the first image displayed and an image of the subject uniformly illuminated. Accordingly, the image of the uniformly illuminated subject may be extracted, via pixel-wise division by the first image. This approach provides concurrent display and image capture using a minimal scanned-beam configuration, but naturally, the captured image of the subject may be prone to spatially inhomogeneous noise arising from inhomogeneous illumination.

In another embodiment, the illumination beam used for concurrent image display and image capture may comprise one or more visible lasers for display of a first image, and an additional invisible (e.g., infrared or ultraviolet) laser for capture of a second image. The display and imaging beams may be combined substantially as shown in FIG. 1. In this embodiment, the invisible laser may be kept on at constant intensity; the second image may be captured via narrow-band detection of the invisible wavelength alone. Accordingly, reflected light from one or more modulated visible lasers may be blocked by arranging an appropriate filter in front of the photodetector.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A system for displaying or capturing an image, the system comprising:
  at least one laser arranged to direct light into an illumination beam;
  a mirror coupled in a highly resonant mirror-mount system and configured to reflect the illumination beam;
  a transducer configured to deflect the mirror so that the illumination beam scans through an area where the image is to be displayed or captured; and
  a controller configured to apply a drive signal to the transducer, the drive signal having a pulse frequency approaching a resonance frequency of the mirror-mount system, and to address each pixel of the image in synchronicity with the drive signal, delaying the addressing of each pixel by an adjustable amount relative to a pulse of the drive signal, the adjustable amount based, in an open-loop manner without position-detection feedback during image display or capture, on a temperature of the mirror, and determined based on an intensity of the illumination beam by interpolation among a plurality of predetermined delay amounts corresponding to a plurality of preset illumination-beam intensities.

2. The system of claim 1, wherein addressing each pixel of the image comprises adjusting an intensity of the illumination beam for each pixel of the image as the illumination beam scans through the area.

3. The system of claim 1, wherein addressing each pixel of the image comprises registering a detected intensity of light from the illumination beam for each pixel of the image as the illumination beam scans through the area.

4. The system of claim 1, wherein the controller comprises a voltage-controlled oscillator configured to generate a pulse train of adjustable frequency.

5. A system for displaying or capturing an image, the system comprising:
   at least one laser arranged to direct light into an illumination beam;
   a mirror coupled in a highly resonant mirror-mount system and configured to reflect the illumination beam;
   a transducer configured to deflect the mirror so that the illumination beam scans through an area where the image is to be displayed or captured; and
   a controller configured to apply a drive signal to the transducer, the drive signal having a pulse frequency approaching a resonance frequency of the mirror-mount system, and to address each pixel of the image in synchronicity with the drive signal, delaying the addressing of each pixel by an adjustable amount relative to a pulse of the drive signal, the adjustable amount based, in an open-loop manner without position-detection feedback during image display or capture, on a temperature of the mirror, the controller including a voltage-controlled oscillator configured to generate a pulse train of adjustable frequency and a first counter divider configured to receive the pulse train from the voltage-controlled oscillator and to provide a lower-frequency pulse train to second and third counter dividers.

6. A system for displaying or capturing an image, the system comprising:
   at least one laser arranged to direct light into an illumination beam;
   a mirror coupled in a highly resonant mirror-mount system and configured to reflect the illumination beam;
   a transducer configured to deflect the mirror so that the illumination beam scans through an area where the image is to be displayed or captured; and
   a controller configured to apply a drive signal to the transducer, the drive signal having a pulse frequency approaching a resonance frequency of the mirror-mount system, and to address each pixel of the image in synchronicity with the drive signal, delaying the addressing of each pixel by an adjustable amount relative to a pulse of the drive signal, the adjustable amount based, in an open-loop manner without position-detection feedback during image display or capture, on a temperature of the mirror, the controller including a voltage-controlled oscillator configured to generate a pulse train of adjustable frequency, a first counter divider configured to receive the pulse train from the voltage-controlled oscillator and to provide a lower-frequency pulse train to second and third counter dividers, a first delay timing circuit configured to delay a pulse train of the second counter divider by an adjustable amount, and a second delay timing circuit configured to delay a pulse train from the third counter divider by an adjustable amount.

7. The system of claim 5, wherein addressing each pixel of the image comprises adjusting an intensity of the illumination beam for each pixel of the image as the illumination beam scans through the area.

8. The system of claim 5, wherein addressing each pixel of the image comprises registering a detected intensity of light from the illumination beam for each pixel of the image as the illumination beam scans through the area.

9. The system of claim 1, wherein applying the drive signal comprises adjusting the pulse frequency of the drive signal to track the resonance frequency as the resonance frequency varies.

10. The system of claim 1, wherein the mirror-mount system has a resonance quality factor Q above one hundred.

11. The system of claim 1, wherein the pulse frequency approaches the resonance frequency to within one hundred parts per million.

12. The system of claim 5, wherein applying the drive signal comprises adjusting the pulse frequency of the drive signal to track the resonance frequency as the resonance frequency varies.

13. The system of claim 5, wherein the mirror-mount system has a resonance quality factor Q above one hundred.

14. The system of claim 5, wherein the pulse frequency approaches the resonance frequency to within one hundred parts per million.

15. The system of claim 1 wherein the image is a first image, the system further comprising:
   a photodetector configured to detect light from the illumination beam reflected off a subject, wherein the controller is further configured to register a detected light intensity for each pixel of a second image in synchronicity with the drive signal to capture the second image.

16. The system of claim 15, wherein the controller is further configured to correct the second image by dividing a brightness of each pixel of the second image by a brightness of each corresponding pixel of the first image.

17. The system of claim 15, wherein the at least one laser includes a modulated, visible-wavelength laser and an unmodulated, invisible-wavelength laser, wherein the controller is configured to adjust an intensity of the visible-wavelength laser in synchronicity with the drive signal, and wherein the photodetector is limited in responsiveness to an emission of the invisible-wavelength laser.

18. The system of claim 1 further comprising two photodetectors, one sensitive to a horizontal and the other to a vertical position of the illumination beam.

19. The system of claim 18 wherein the controller is further configured to sense a response of the two or more photodetectors when crossed by the illumination beam and thereby forecast a phase delay in the system at a given illumination intensity prior to image display or capture.

20. The system of claim 19 wherein the controller is further configured to vary the given illumination intensity and thereby predict the phase delay at the plurality of preset illumination-beam intensities.

* * * * *